May 17, 1932.  P. I. HOLLMAN  1,858,503
BROILER OVEN
Filed Dec. 13, 1928   2 Sheets-Sheet 1
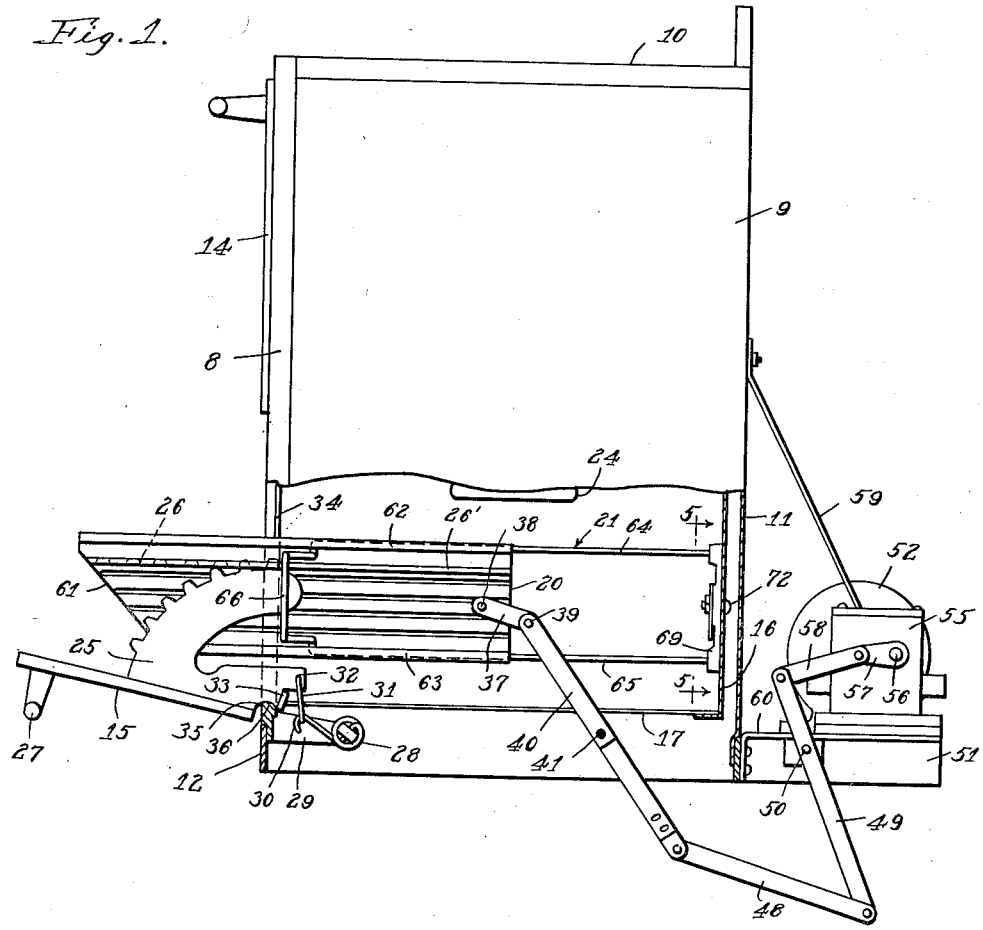
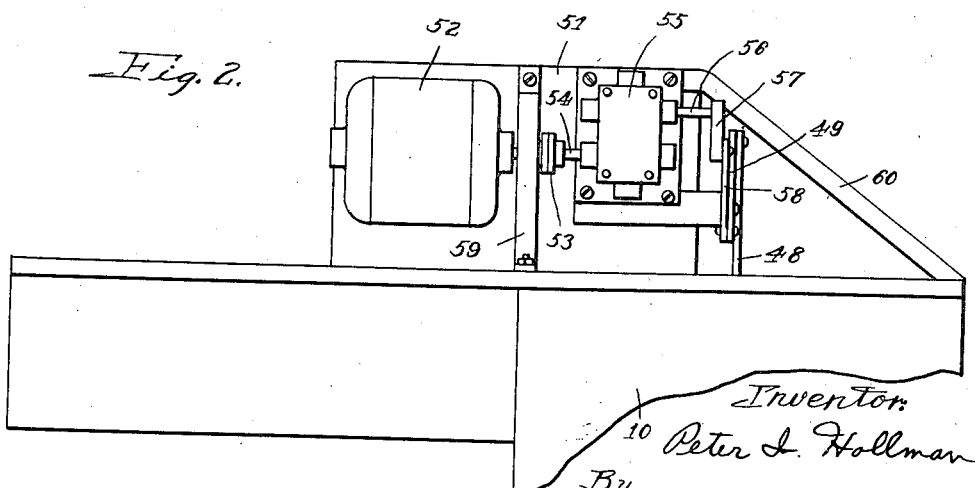

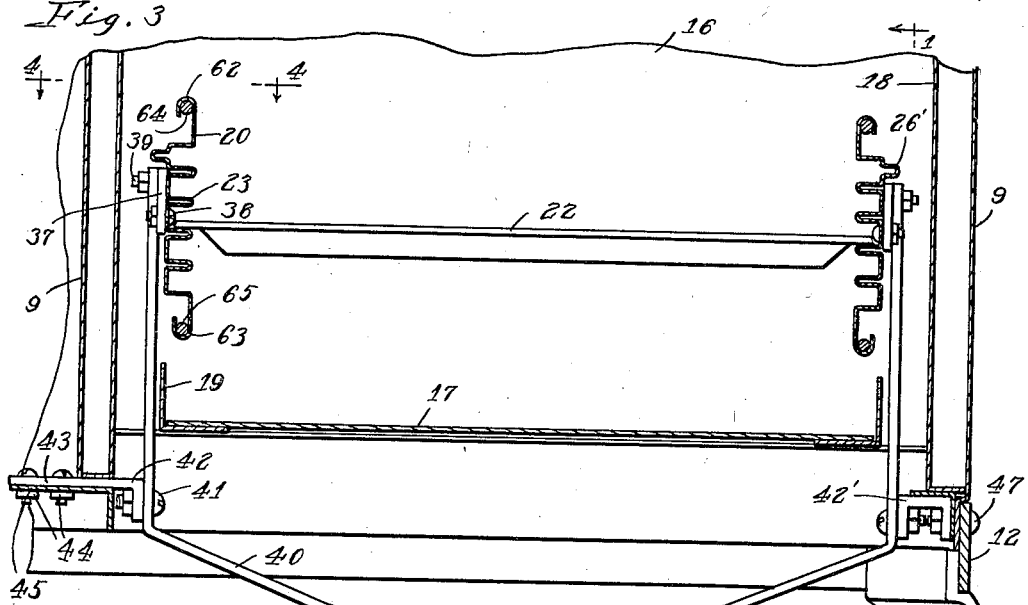
May 17, 1932.  P. I. HOLLMAN  1,858,503
BROILER OVEN
Filed Dec. 13, 1928  2 Sheets-Sheet 2

Patented May 17, 1932

1,858,503

UNITED STATES PATENT OFFICE

PETER I. HOLLMAN, OF ROCKFORD, ILLINOIS, ASSIGNOR TO GEO. D. ROPER CORPORATION, OF ROCKFORD, ILLINOIS, A CORPORATION OF ILLINOIS

BROILER OVEN

Application filed December 13, 1928. Serial No. 325,683.

This invention relates to broiler ovens for gas and electric stoves and ranges.

In the manufacture of stoves having broiler ovens of the in-a-door or in-a-drawer type, the matter of the ease with which the broiler can be disassembled for cleaning cannot be overlooked and it is, therefore, the principal object of my invention to provide an in-a-door broiler especially designed and constructed with that purpose in view; all parts of the broiler, as well as all of the flues and both oven bottoms, being arranged for quick and easy removal and replacement. More particularly stated, I have provided in the broiler oven of my invention, slides for supporting the broiler pan which are removable through the oven door opening with their guides, the latter being easily and quickly detachable and removable from their mountings within the oven, the removal of said guides making it possible thereafter to remove all of the flues with the same facility as in the case of a stove having the old type of broiler oven, as exemplified by my Patent 1,573,941 issued February 23, 1926.

The above and other special features of my invention will appear in the course of the following detailed description, in which reference is made to the accompanying drawings, wherein—

Figure 1 is a side view of a stove embodying my improved broiler oven, the same being shown in connection with a motor-driven mechanism for continuously opening and closing the oven for display purposes;

Fig. 2 is a plan view of a part of Fig. 1;

Fig. 3 is a vertical transverse cross-section through the broiler oven on a somewhat enlarged scale;

Fig. 4 is a horizontal longitudinal cross-section through a part of Fig. 3 on the line 4—4 of Fig. 3, part of the view being broken away;

Fig. 5 is a fragmentary view mostly in elevation but partly in section on the line 5—5 of Fig. 1, and Figs. 6 and 7 are sections through Fig. 5 on the lines 6—6 and 7—7 thereof.

The same reference numerals are applied to corresponding parts throughout the views.

The broiler herein disclosed is an improvement on that shown in my copending application Serial No. 264,314, filed March 24, 1928.

The gas range in connection with which I have illustrated my invention is generally of conventional construction comprising a cast front frame 8 and sheet metal side, top and back walls 9, 10 and 11 respectively. These walls are fastened to the base band 12 and, of course, the usual supporting legs 13 are provided fastened to the base band. A baking oven door 14 is provided in the upper part of the front frame 8 and a broiler oven door 15 in the lower part. The internal construction of the double oven section is for the most part the same as that shown in my patent above referred to, there being a back flue 16 providing a supporting ledge at the back of the oven for the broiler oven bottom 17 and side flues 18 which, like the back flue, extend the full height of the double oven section. It will presently appear how the back flue 16, bottom 17 and side flues 18 are arranged for quick and easy removal, just as described in said patent, after the disassembling of the broiler. Small sheet metal strips 19, taking the place of the side linings otherwise provided in the ordinary broiler oven, provide support for the side edges of the bottom 17 and are, of course, easily removable therewith. So much for a general description of the various parts of the stove which will enter into the following discussion of my invention.

Referring for the moment only in a general way to the various parts of the broiler, the slides 20 operating on the guides 21 and arranged to support the broiler pan 22 on ledges 23 at different elevations with respect to the burner 24, are operated as described in my copending application above referred to, namely, by the meshing engagement of gear segments 25 mounted on the inside of the door 15 in racks 26 provided on the outer sides of the slides. In the normal use of the stove in the home, the slides 20 are, of course, extended from the oven and likewise returned by the manual opening and closing of the door 15, the housewife or other operator using the handle 27 provided on the door 15 for that purpose. In the opening of the door a coiled tortion spring 28 is wound sufficiently to keep the door from dropping with a jar. The spring is mounted on a bracket 29 and has one end thereof fixed thereto, the other end being extended on a tangent and hooked as appears at 30 for detachable connection with one end of a link 31, the other end of which is hooked into a hole 32 provided in the gear segment at a predetermined radius with respect to the axis about which the door 15 and gear segments 25 are arranged to operate. The opening of the door 15 is arranged to be limited positively by a laterally bent lug 33 formed on each gear segment 25, which is made of sheet metal, substantially as described in my copending application. The lugs 33 engage the inside of the door jamb 34 when the door 15 is opened to a substantially horizontal position. The gear segments 25 have substantially semicircular bearing surfaces 35 concentric with the toothed peripheries thereof arranged to ride on the rounded bearings 36 provided therefor on the front frame 8 substantially as described in the copending application. Now, in the present case I have provided motor driven mechanism for the continuous or repeated operation of the broiler, which, for convenience, is arranged to operate the broiler through connection with the slides 20. Links 37 are pivotally connected at 38 to the outside of the slides 20 and have pivotal connection at 39 with the two arms of a forked rocker frame 40. The latter is mounted for oscillation on trunnions 41 provided on brackets 42 and 42'. The former, it will be observed in Fig. 3, has an outwardly reaching portion 43 arranged to be slipped beneath the side flue 18 and detachably bolted as at 44 onto the bottom 45 of the burner box compartment. The bracket 42' has a bent end 46 arranged to be bolted or otherwise detachably secured as at 47 to the base band 12. While it is readily conceivable that the rocker frame 40 might be oscillated through the medium of any other suitable power means connected therewith in any suitable manner, I prefer to operate the frame 40 from the middle thereof by means of a link 48 pivotally connected to a lever 49 pivoted at 50 for oscillation relative to a bracket 51 fastened to the base band 12 on the back of the stove and providing a support for an electric motor 52. The motor 52 is coupled, as at 53, to the input shaft 54 of a speed reduction unit 55 of any suitable or preferred form mounted on the bracket 51 as shown. The output shaft 56 of said unit has a crank 57 fixed thereon and connected by means of a link 58 to the free end of the lever 49 previously referred to, whereby in the operation of the motor to cause the oscillation of the lever 49 and with it the oscillation of the rocker frame 40, and hence the reciprocation of the slides 20 on the guides 21 accompanied by the opening and closing of the door 15. The speed of the motor 52 is such that with a reduction unit having a ratio of 100:1 the slides 20 will be operated back and forth about fifteen times per minute, that being approximately the most desirable rate of operation for demonstration purposes. Since the motor driven mechanism has connection with the rocker frame 40 at the middle thereof, there is no tendency for any of the parts to bind, such as there might be if the power were transmitted from one side of the oven. Furthermore, when the stove is being displayed, the motor and mechanism, as well as the intermediate linkage, is hidden from view because of the mounting thereof on the back of the stove and the connection of the rocker frame with the slides at the inner ends thereof and through the bottom of the broiler oven. In other words, there is nothing in the application of the motor drive which in any way detracts from the appearance of the stove and nothing to conflict with the prospective customers getting a good impression of the handiness and desirability of the broiler feature. Then, too, it is obvious that attention is attracted to the stove by reason of the operation of the broiler and genuine interest is aroused by this good portrayal of the broiler feature. In passing, attention is also directed to the fact that the motor drive can be applied and removed without great difficulty; the brackets 42 and 42' can be fastened onto the stove without necessitating marring the same to any noticeable degree, and the same is true of the bolting of the links 37 to the slides 20 at 38. The bracket 51 can, of course, be fastened by a few screws to the base band on the back of the stove especially if a brace 59 is provided to sustain the load of the motor 52 and reduction unit 55, and another brace 60 is provided to assume the thrust fore and aft incident to the operation of the rocker frame 40.

Referring now particularly to Figs. 1 and 3 to 7, it will be seen that I have made certain improvements in the construction of the broiler itself from what is shown in my copending application. The slides 20 are each preferably formed from a single piece of sheet metal for low cost as well as to make for a lighter and easier operating broiler, the ledges 23 being formed by ribs crimped in the middle and extending longitudinally of the slide substantially as described in the copending application, and as best appears in Fig. 3, and the front ends of the both slides being cut off diagonally, as shown at 61, for the purpose of avoiding interference with the oven door 15 as much as for the advantage of facilitating the entering of the broiler pan onto any selected pair of ledges. In the present case, however, I have bent the upper and lower edges of each slide the full length thereof to form channel shaped bearings 62 and 63 arranged to have a free working fit on the parallel arms 64 and 65 of the guide 21, which serve as top and bottom ways respectively. Thus, the guideways are completely covered by the slides and protected against having grease and dirt collect thereon, which, of course, insures the continued smooth and easy operation of the slides when the stove is in service. I also prefer to crimp each of the sheet metal slides longitudinally, as appears at 26', and to make perforations in the crimped portion to provide the rack 26. The guides 21 are suitably formed of heavy wire or rod having sufficient stiffness to provide good support for the slides and each is bent generally into U form to provide the parallel arms 64 and 65 just referred to. The bight portion 66 of each guide is bent into laterally offset relation with respect to the arms 64 and 65 for reception in recesses 67 suitably provided by lugs cast integral with the front frame 8 on the inside of the latter adjacent the door jamb 34. The free ends of the arms 64 and 65 are arranged to be held in the position shown by reception in holes 68 in a cast plate 69 arranged to be detachably secured to the wall of the back flue 16 constituting the back wall of the broiler oven. So long as the plate 69 is fastened to the wall, the guide 21 is held firmly in place. I have, however, provided means whereby the plate 69 may be detached with very little difficulty when it is desired to disassemble the broiler for a thorough cleaning or inspection, it being understood, however, that under ordinary circumstances it is hardly ever necessary to take the broiler apart in order to clean it well enough for all practical purposes. The plate 69 has a center hole 70 to accommodate the nut 71 which fastens a bolt 72 onto the wall of the flue 16. Lugs 73, punched and bent inwardly from the wall of the flue 16 and engaging one side of the plate 69, are arranged to locate the plate in proper position as well as to hold it in such position when the plate is fastened to the wall, it being evident that with the nut 71 engaged in the hole 70 in the plate, it is impossible for the plate to move sideways away from the lugs 73. A small latch 74 stamped from sheet metal has a key-hole slot 75 punched therein, the large end of which is arranged to permit the passage therethrough of another nut 76 threaded on the bolt 72. After the nut has been projected through the large end of the key-hole slot, longitudinal movement of the latch brings the small end of the slot under the nut to retain the latch in position on a flat seat 77 provided therefor around the hole 70 on the front of the plate 69. The one end of the latch 74 is cut off on an arc, as indicated at 78, and is arranged to engage a projection 79 on the plate 69. The other end of the latch 74 is crimped to provide a longitudinal bead 80 arranged to receive a projection 81 formed on the seat 77. The lateral edges of the latch 74 are crimped longitudinally, as shown at 82, to reinforce the same so that the latch will not be apt to bend. Now, it will be seen that in the fastening of the plate 69 to the wall of the flue 16, it is only necessary to slip the same over the nut 71 and against the side of the lugs 73 whereupon the latch 74 can be slipped over the nut 76 and turned to locked position, in which position it is positively held against endwise movement by the projection 79 and against turning by the projection 81. Inasmuch as the edges of the latch 74 are crimped to the form best evident in Fig. 7, it will be seen that the same can be turned by hand without danger of getting cut or scratched. In unfastening the plate, it is obviously as simple a matter to turn the latch, remove it, and then slip the plate over the nuts 71 and 76 and away from the lugs 73, whereupon it is possible to swing the inner end of the guide toward the center of the oven to detach the bight portion 66 thereof at the front of the oven and thus permit the disengagement of the rack on the slide from its gear segment and removal of the slide and guide together from the oven. Once the slides and guides have been removed from the oven, the flues 16 and 18 as well as the oven bottom 17 and the other oven bottom (not shown) can, of course, be removed with ease and facility substantially as described in my patent above referred to.

It is believed that the foregoing description conveys a clear understanding of my invention and of its various objects and advantages. While reference has been made in the foregoing description to specific details of construction, it should be understood that the invention is not limited in these respects, but that it is the intention in the appended claims to cover all legitimate modifications and adaptations.

I claim:

1. In a broiler oven, the combination with a burner mounted in the upper portion of said oven, and an oven door arranged to swing down in opening, of guides in said oven at opposite sides thereof each providing upper and lower guideways, a pair of slides at opposite sides of said oven providing a plurality of vertically spaced ledges for supporting a broiler pan at different elevations with respect to the burner, said slides being formed of sheet metal and each having the upper and lower edges thereof bent substantially the full length thereof to provide bearing portions slidably received on said guideways, and means providing an operating connection between said slides and the oven door whereby the slides are arranged to be extended in the opening of the door and returned in the closing thereof.

2. In a stove structure as set forth in claim 1 wherein the last mentioned means comprises gear segments mounted on the inside of the oven door arranged to mesh in racks on the outside of the slides, the said slides being each formed from a single piece of sheet metal crimped longitudinally to provide an outwardly directed rib, the latter being provided with spaced openings to receive the teeth of the gear segment cooperating with the slide whereby the rack is formed on the slide.

3. In a broiler oven, the combination with a burner mounted in the upper portion of said oven, and an oven door arranged to swing down in opening, of a pair of guides at opposite sides of said oven, a pair of slides operable thereon and formed each from a single piece of sheet metal crimped longitudinally to provide inwardly directed vertically spaced ribs to serve as supporting ledges for a broiler pan at different elevations with respect to the burner, said slides being each crimped longitudinally to provide an outwardly directed rib, the latter being provided with spaced openings at the forward end of the slides to provide racks on said slides, and a pair of gear segments mounted on the inside of the oven door extending inwardly alongside the outside of the slides and having the teeth thereof arranged to mesh in the aforesaid openings whereby to extend the slides in the opening of the door and to return the same in the closing thereof.

4. In a broiler oven having a burner mounted in the upper portion thereof and an oven door hingedly mounted at the front thereof, a pair of slides for supporting a broiler pan arranged to be slidably supported at opposite sides of the oven, each of said slides being formed preferably from sheet metal and providing bearing portions at the top and bottom edges thereof, said slides having ledges thereon for supporting a broiler pan at different elevations with respect to the burner, guides for said slides provided in said oven at opposite sides thereof, each of said guides comprising a pair of parallel vertically spaced substantially horizontal rods having the bearing portions of said slides slidably received thereon, fixed means in the oven having one end of the guides detachably engaged thereon, and means demountably supported in the oven and providing support for the other end of the guides.

5. A stove structure as set forth in claim 4 wherein the last mentioned means for each guide comprises a plate having recesses provided therein for the reception of the ends of the rods, and means for detachably securing the plate to the wall of the oven.

6. A stove structure as set forth in claim 4 wherein the last mentioned means for each guide comprises a plate having recesses provided therein for the reception of the ends of the rods, and means for detachably securing the plate to the wall of the oven, comprising a stud having a part thereon arranged to serve as a head, said plate having an opening permitting the passage therethrough of the head, and a latch having a key-hole slot therein arranged to have the head passed through the large end of the slot, the latch being then arranged to be engaged beneath the head with the stud received in the small end of the slot.

7. A stove structure as set forth in claim 4 wherein the last mentioned means for each guide comprises a plate having recesses provided therein for the reception of the ends of the rods, and means for detachably securing the plate to the wall of the oven, comprising a stud having a part thereon arranged to serve as a head, said plate having an opening permitting the passage therethrough of the head, and a latch having a key-hole slot therein arranged to have the head passed through the large end of the slot, the latch being then arranged to be engaged beneath the head with the stud received in the small end of the slot, there being a projection on said plate arranged when the latch is turned to a position in alignment therewith to abut the one end of said latch to hold the same against endwise movement and prevent displacement from the stud, and another projection provided on the plate arranged for engagement with the latch to keep the same from turning from the locked position.

8. A stove structure as set forth in claim 4 wherein the last mentioned means for each guide comprises a plate having recesses provided therein for the reception of the ends of the rods, and means for detachably securing the plate to the wall of the oven, comprising a stud having a part thereon arranged to serve as a head, said plate having an opening permitting the passage therethrough of the head, and a latch stamped from a single piece of sheet metal having a key-hole slot therein arranged to have the head passed through the large end of the slot, the latch being then arranged to be engaged beneath the head with the stud received in the small end of the slot, there being a projection on said plate arranged when the latch is turned to a position in alignment therewith to abut the one end of said latch to hold the same against endwise movement and prevent displacement from the stud, and another projection provided on the plate arranged for engagement with the latch to keep the same from turning from the locked position, the latter projection being rounded in form and the latch having a recess provided therein arranged when the latch is caused to ride over the projection toward locked position to engage in the recess.

9. A stove structure as set forth in claim 4 wherein the last mentioned means for each guide comprises a plate having recesses provided therein for the reception of the ends of the rods, and means for detachably securing the plate to the wall of the oven comprising a stud having a part thereon arranged to serve as a head, said plate having an opening permitting the passage therethrough of the head, and a latch stamped from a single piece of sheet metal having a key-hole slot therein arranged to have the head passed through the large end of the slot, the latch being then arranged to be engaged beneath the head with the stud received in the small end of the slot, there being a projection on said plate arranged when the latch is turned to a position in alignment therewith to abut the one end of said latch to hold the same against endwise movement and prevent displacement from the stud, and another projection provided on the plate arranged for engagement with the latch to keep the same from turning from the locked position, the latter projection being rounded in form and the latch having a recess provided therein arranged when the latch is caused to ride over the projection toward locked position to engage in the recess, and at least the one lateral edge of said latch being crimped longitudinally to provide a reinforcing flange to keep the latch from bending under the transverse strain incident to riding over said projection.

10. In a broiler oven, the combination with a burner mounted in the upper portion of said oven, and an oven door arranged to swing down in opening, of a pair of guides at opposite sides of said oven, a pair of slides operable on said guides freely back and forth and having means on the inside thereof arranged to support a broiler pan therebetween at different elevations with respect to the burner, racks provided on the outside of said slides, and a pair of gear segments mounted on the inside of the oven door extending inwardly alongside the outside of the slides and having the teeth thereof meshing with the aforesaid racks whereby to extend the slides in the opening of the door and to return the same in the closing thereof, said gear segments having stop projections thereon arranged to strike an abutment to limit the movement of the door in opening and thereby limit the outward movement of the slides.

11. In a broiler oven having a burner mounted in the upper portion thereof, and an oven door hingedly mounted at the front thereof, a pair of slides for supporting a broiler pan arranged to be slidably supported at opposite sides of the oven, each of said slides having bearing portions provided thereon and having ledges thereon for supporting a broiler pan at different elevations with respect to the burner, guides for said slides provided in said oven at opposite sides thereon having the bearing portions of said slides slidably received thereon, fixed means in the oven having one end of the guides detachably engaged thereon for support, and means demountably supported in the oven and providing support for the other end of the guides.

12. A broiler oven having a burner mounted in the upper portion thereof and an oven door hingedly mounted at the front thereof, a pair of slides for supporting a broiler pan arranged to be slidably supported at opposite sides of the oven, each of said slides having bearing portions provided at the top and bottom edges thereof, guides for said slides provided in said oven at opposite sides thereof, each of said guides comprising a pair of parallel vertically spaced substantially horizontal rods having the bearing portions of said slides slidably received thereon, fixed means in the oven at the forward end of the guides having the latter detachably engaged thereon for support, a pair of plates at the rear end of the guides for supporting the same, there being struck up projections on the sheet metal rear wall of the oven arranged to be engaged by said plates for locating the latter in proper position, and means for detachably securing said plates to said wall.

13. A broiler oven having a burner mounted in the upper portion thereof and an oven door hingedly mounted at the front thereof, a pair of slides for supporting a broiler pan arranged to be slidably supported at opposite sides of the oven, each of said slides having bearing portions provided at the top and bottom edges thereof, guides for said slides provided in said oven at opposite sides thereof, each of said guides being made from a single piece of rod material providing a pair of parallel vertically spaced substantially horizontal rods whereon the bearing portions of the slides are arranged to be slidably received and providing a connecting cross portion at one end of said rods bent in a plane at right angles to the plane of the rods, means in the oven at one end of the guides arranged to have the cross portions detachably engaged thereon for support, a pair of plates having recesses for reception of the ends of said rods at the other ends of the guides for support thereof, and means for demountably securing the plates in the oven.

In witness of the foregoing I affix my signature.

PETER I. HOLLMAN.